US012698092B2

(12) United States Patent

Jang et al.

(10) Patent No.: US 12,698,092 B2

(45) Date of Patent: Aug. 4, 2026

(54) SYSTEM AND METHOD FOR BREAKAWAY DURING AIR-TO-AIR REFUELING

(71) Applicant: The Boeing Company, Arlington, VA (US)

(72) Inventors: Jung Soon Jang, Bellevue, WA (US); Justin Cleve Hatcher, Sumner, WA (US)

(73) Assignee: The Boeing Company, Arlington, VA (US)

( * ) Notice: Subject to any disclaimer, the term of this patent is extended or adjusted under 35 U.S.C. 154(b) by 142 days.

(21) Appl. No.: 18/657,218

(22) Filed: May 7, 2024

(65) Prior Publication Data

US 2025/0346360 A1 Nov. 13, 2025

(51) Int. Cl.
B64D 39/00 (2006.01)
B64D 39/06 (2006.01)

(52) U.S. Cl.
CPC ............. B64D 39/00 (2013.01); B64D 39/06 (2013.01)

(58) Field of Classification Search
CPC ................................ B64D 39/06; B64D 39/00
See application file for complete search history.

(56) References Cited

U.S. PATENT DOCUMENTS

| | | | | | |
|---|---|---|---|---|---|
| 4,158,885 | A * | 6/1979 | Neuberger | ............. | B64D 39/00 |
| | | | | | 244/135 A |
| 6,752,357 | B2 * | 6/2004 | Thal | ........................ | B64D 39/06 |
| | | | | | 244/135 A |
| 9,038,954 | B2 * | 5/2015 | Hatcher | ................. | B64D 39/06 |
| | | | | | 244/135 A |
| 9,132,921 | B2 * | 9/2015 | Hatcher | ................. | B64D 39/00 |
| 9,150,310 | B1 * | 10/2015 | Bray | ....................... | B64D 39/00 |
| 9,315,277 | B2 * | 4/2016 | Foo | ......................... | B64D 39/04 |
| 11,254,440 | B2 * | 2/2022 | Ropers | ................... | B64D 39/06 |
| 2008/0250423 | A1 | 10/2008 | Bush et al. | | |
| 2022/0306311 | A1 * | 9/2022 | Kyono | .................. | B64D 39/00 |
| 2023/0215041 | A1 | 7/2023 | Nguyen et al. | | |

FOREIGN PATENT DOCUMENTS

| | | |
|---|---|---|
| AU | 2022291676 A1 | 7/2023 |
| EP | 3772464 A1 | 2/2021 |

OTHER PUBLICATIONS

Extended European Search Report for European Application No. EP25169080.6 dated Oct. 2, 2025, 13 pages.

* cited by examiner

*Primary Examiner* — Richard Green

(74) *Attorney, Agent, or Firm* — Harrity & Harrity, LLP

(57) ABSTRACT

A boom guidance system for use during an automated air-to-air refueling (A3R) mission. The boom guidance system includes sensors configured to output sensor data indicative of a three-dimensional (3D) position of a fuel-receiving aircraft (receiver) and a refueling boom of a fuel-supplying aircraft (tanker) in a tanker reference frame and a boom reference frame, respectively. An electronic control unit ("ECU") is in communication with the sensors. The ECU is programmed to receive the sensor data and determine coordinates for a receptacle on the receiver in a tanker reference frame. The ECU is also programmed to transform the coordinates for the receptacle in the tanker reference frame into boom parameters, determine a receiver status for the receiver based on the boom parameters, and initiate an automatic breakaway of the refueling boom from the receiver when the receiver status satisfies a corresponding automatic breakaway condition.

20 Claims, 3 Drawing Sheets

A3R Mission

SYSTEM AND METHOD FOR BREAKAWAY DURING AIR-TO-AIR REFUELING

BACKGROUND

Air-to-air refueling is the process by which aviation fuel is transferred from a fuel-supplying aircraft ("tanker") to a fuel-receiving aircraft ("receiver") while the tanker and receiver fly together in close formation. Air-to-air refueling allows the receiver to remain airborne for extended periods of time, or to increase its flight range relative to traditional stationary/ground-based refueling options.

During boom refueling in particular, aviation fuel is offloaded via an intervening boom apparatus ("refueling boom") from a fuel tank located aboard the tanker to a fuel tank of the receiver. The motion trajectory of the boom is typically controlled by fly-by-wire in response to manual control inputs from one or more boom operators situated at a control station aboard the tanker. Using the control station, the boom operators carefully align a distal end ("boom tip") of the boom with a fuel receptacle on the receiver while respective pilots of the tanker and receiver minimize relative motion between the two aircraft. After alignment, the boom tip securely engages the receptacle. Aviation fuel is then transferred to the receiver through a fuel conduit in the refueling boom.

Aboard a modern tanker, the aforementioned control station is typically located just aft of the tanker's cockpit. In this forward position, the refueling boom and the receiver are well outside of the direct view of the boom operators. The boom operators are therefore assisted in visualizing the boom and the receiver via a live video feed from one or more tanker-mounted cameras. Real-time image data of the boom and receiver are then projected onto high-resolution display screens of the control station. In this manner, the boom operators are able to monitor and control the aerial refueling process.

SUMMARY

Disclosed herein is a boom guidance system for use during an automated air-to-air refueling (A3R) mission. The boom guidance system includes sensors configured to output sensor data indicative of a three-dimensional (3D) position of a fuel-receiving aircraft (receiver) and a refueling boom of a fuel-supplying aircraft (tanker) in a tanker reference frame and a boom reference frame, respectively. The system also includes an electronic control unit ("ECU") in communication with the sensors. The ECU is programmed to receive the sensor data regarding a location of a receptacle on the receiver and determine coordinates for a receptacle on the receiver in a tanker reference frame. The ECU is also programmed to transform the coordinates for the receptacle in the tanker reference frame into boom parameters and determine a receiver status for the receiver based on the boom parameters. The ECU is also programmed to initiate an automatic breakaway of the refueling boom from the receiver when the receiver status satisfies a corresponding automatic breakaway condition.

In one or more embodiments, the sensors include a rearward-facing camera configured to output real-time image data as part of the sensor data, and wherein the ECU is configured to identify the receptacle on the receiver during the A3R mission.

In one or more embodiments, the boom parameters include a pitch, a roll, and a telescopic position of the receiver relative to a boom reference frame and corresponding rates of change for the pitch, the roll, and the telescopic position.

In one or more embodiments, the ECU is programmed to determine if a magnitude of at least one of the corresponding rates of change satisfies a corresponding automatic breakaway condition and initiate the automatic breakaway if satisfied.

In one or more embodiments, the receiver status includes a position of the receiver relative to a disconnect envelope surrounding the receiver or a contact envelope for the receptacle on the receiver.

In one or more embodiments, the ECU is programmed to determine if the position of the receiver relative to the disconnect envelope or the contact envelope satisfies a corresponding automatic breakaway condition and initiate the automatic breakaway if satisfied.

In one or more embodiments, the receiver status includes a distance between the refueling boom and the receiver.

In one or more embodiments, the ECU is programmed to determine if the receiver is out of range for engagement with the refueling boom or if the receiver is too close for engagement with the refueling boom.

In one or more embodiments, the ECU is programmed to determine a closure rate of the receiver based on the boom parameters and initiate the automatic breakaway if the closure rate satisfies a corresponding breakaway condition.

In one or more embodiments, the automatic breakaway of the refueling boom includes performing an evasive maneuver with the refueling boom.

In one or more embodiments, the ECU is programmed to maintain the refueling boom in an automatic breakaway position until the receiver status that satisfied the corresponding automatic breakaway condition is no longer satisfied.

Disclosed herein is a method for controlling an automated air-to-air refueling (A3R) mission. The method includes receiving sensor data regarding a location of a receptacle on the receiver. The sensor data is indicative of a three-dimensional (3D) position of a fuel-receiving aircraft (receiver) and a refueling boom of a fuel-supplying aircraft (tanker) in a tanker reference frame and a boom reference frame. The method also includes determining coordinates for a receptacle on the receiver in a tanker reference frame and transforming the coordinates of the receptacle in the tanker reference frame into boom parameters. The method also includes determining a receiver status for the receiver based on the boom parameters and initiating an automatic breakaway of the refueling boom from the receiver when the receiver status satisfies a corresponding automatic breakaway condition.

In one or more embodiments, the sensor data includes real-time image data obtained from a rearward facing camera on the tanker, and wherein the ECU is configured to identify the receptacle on the receiver during the A3R mission.

In one or more embodiments, the boom parameters include a pitch, a roll, and a telescopic position of the receiver relative to a boom reference frame and corresponding rates of change for the pitch, roll, and telescopic position.

In one or more embodiments, the method includes determining if a magnitude of at least one of the corresponding rates of change satisfies a corresponding automatic breakaway condition and initiating the automatic breakaway if satisfied.

In one or more embodiments, the method includes determining a closure rate of the receiver based on the boom parameters and initiating the automatic breakaway if the closure rate satisfies a corresponding breakaway condition.

In one or more embodiments, the method includes maintaining the refueling boom in an automatic breakaway position until the receiver status that satisfied the corresponding automatic breakaway condition is no longer satisfied.

Disclosed herein is a tanker. The tanker includes a fuselage configured to transport aviation fuel, a refueling boom connected to the fuselage and a boom guidance system for use during an automated air-to-air refueling (A3R) mission. The boom guidance system includes sensors configured to output sensor data indicative of a three-dimensional (3D) position of a fuel-receiving aircraft (receiver) and a refueling boom of a fuel-supplying aircraft (tanker) in a tanker reference frame and a boom reference frame, respectively. The boom guidance system also includes an electronic control unit ("ECU") in communication with the sensors. The ECU is programmed to receive the sensor data regarding a location of a receptacle on the receiver and determine coordinates for a receptacle on the receiver in a tanker reference frame. The ECU is also programmed to transform the coordinates for the receptacle in the tanker reference frame into boom parameters and determine a receiver status for the receiver based on the boom parameters. The ECU is also programmed to initiate an automatic breakaway of the refueling boom from the receiver when the receiver status satisfies a corresponding automatic breakaway condition.

In one or more embodiments, the sensors include a rearward-facing camera configured to output real-time image data as part of the sensor data, and wherein the ECU is configured to identify the receptacle on the receiver during the A3R mission.

In one or more embodiments, the boom parameters include a pitch, a roll, and a telescopic position of the receiver relative to a boom reference frame and corresponding rates of change for the pitch, roll, and telescopic position.

The above summary is not intended to represent every possible embodiment or every aspect of the present disclosure. Rather, the foregoing summary is intended to exemplify some of the novel aspects and features disclosed herein. The features, functions, and advantages of the present disclosure can be achieved independently in various embodiments or may be combined in other embodiments, further details of which may be seen with reference to the following detailed description and accompanying drawings.

Figure 1:
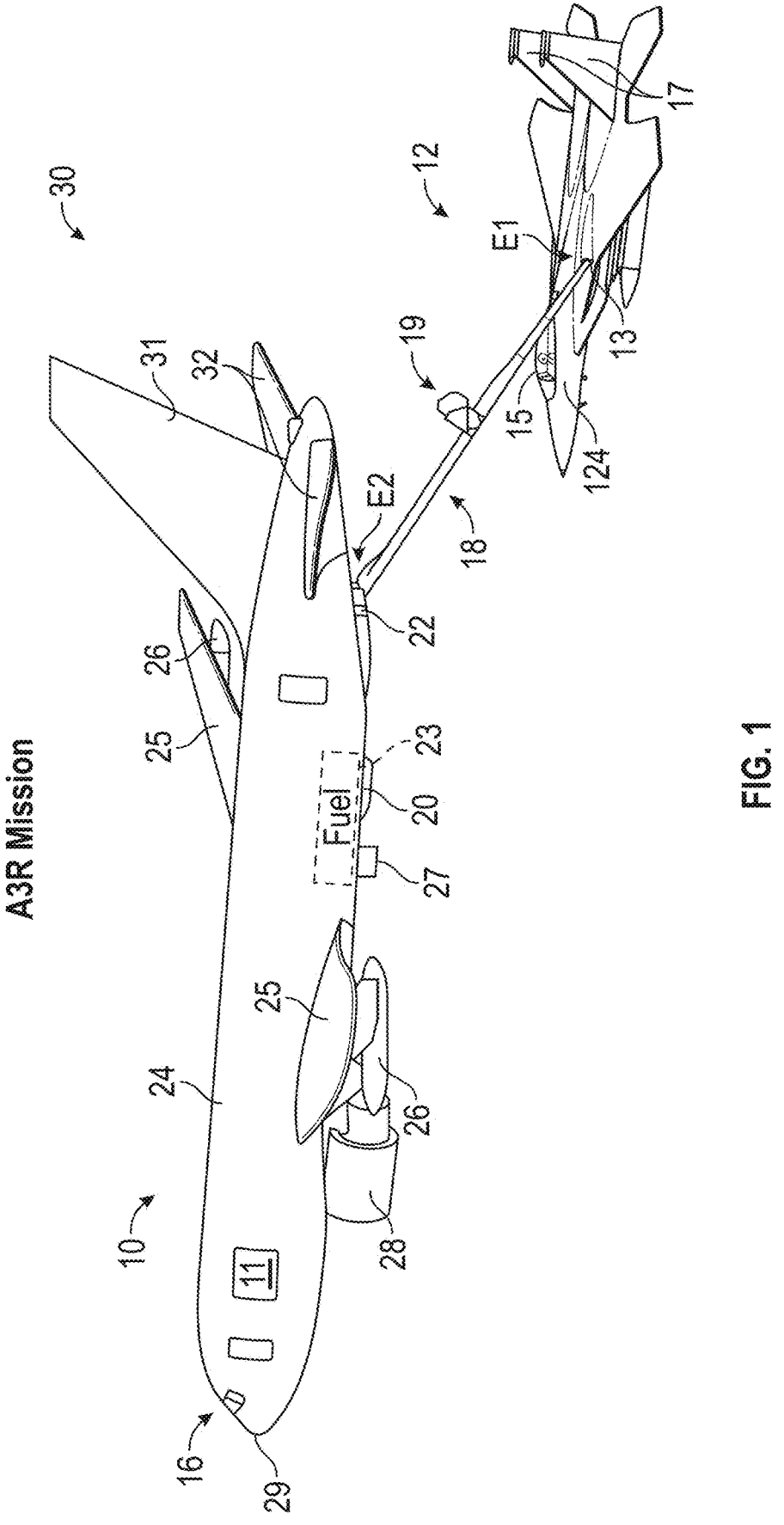
FIG. 1 illustrates a representative automated air-to-air (A3R) refueling mission during which a fuel-supplying aircraft (tanker) delivers aviation fuel to a fuel-receiving aircraft (receiver) through a refueling boom with the assistance of an automatic breakaway method as described herein.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover alternatives falling within the scope of the disclosure as defined by the appended claims.

DETAILED DESCRIPTION

Embodiments of the present disclosure are described herein. It is to be understood, however, that the disclosed embodiments are illustrative examples, and that other embodiments can take various and alternative forms. The Figures are not necessarily drawn to scale and may be schematic. Some features may be exaggerated or minimized to show details of particular components. Therefore, specific structural and functional details disclosed herein are not to be interpreted as limiting, but merely as a representative basis for teaching one skilled in the art to variously employ the present disclosure.

Referring to the drawings wherein like reference numbers refer to the same or like components in the several Figures, and beginning with FIG. 1, a fuel-supplying aircraft (tanker) 10 and a fuel-receiving aircraft (receiver) 12 are shown engaged in a representative automated air-to-air refueling (A3R) mission. As part of this effort, a boom guidance system 11 is programmed to perform an automatic breakaway to prevent contact or collision of a refueling boom 18 and the receiver 12 as the boom 18 trails behind the tanker 10 during the A3R mission. The automatic breakaway is provided herein by performance of a method 100M, a non-limiting example embodiment of which is described below with reference to FIG. 3. In one example, execution of the method 100M can augment an existing flight control methodology when controlling flight of the boom 18.

With respect to the representative tanker 10 of FIG. 1, this aircraft includes a fuselage 24 connected to one or more wings 25. In the illustrated configuration, the fuselage 24 is configured to transport aviation fuel 23. To that end, the fuselage 24 may define a cargo bay with one or more fuel tanks (not shown) holding the aviation fuel 23 for ultimate delivery to the receiver 12 while the tanker 10 and receiver 12 are in flight. Each wing 25 may be connected in some configurations to a refueling pod 26 and one or more engines 28, e.g., jet turbines, with the engines 28 collectively providing sufficient thrust for propelling the tanker 10. The tanker 10 in one or more configurations could also deploy flexible drogues (not shown), with each drogue fluidly coupled to the refueling pods 26 or to the fuselage 24. The fuselage 24 also defines the cockpit 16 proximate a nose 29 of the tanker 10. At the opposite end of the tanker 10, an empennage assembly 30 is connected to the fuselage 24, with an empennage assembly 30 in the representative construction of FIG. 1 including a vertical stabilizer 31 and horizontal stabilizers 32.

The tanker 10 of FIG. 1 is equipped to perform an aerial refueling operation of the type contemplated herein. To that end, the tanker 10 may be embodied as a structurally-modified commercial passenger or transport aircraft having a reinforced airframe suitable for securely transporting the above-noted aviation fuel and associated fuel tanks, and equipped with mission-suitable avionics and control systems. Such modifications collectively enable the tanker 10 to transport aviation fuel to a predetermined rendezvous site with the receiver 12. Upon reaching the rendezvous site, the tanker 10 flies in close formation with the receiver 12, the particular configuration of which may differ from that which is depicted in FIG. 1 and may be automatically identified in some embodiments using the boom guidance system 11.

Figure 2:
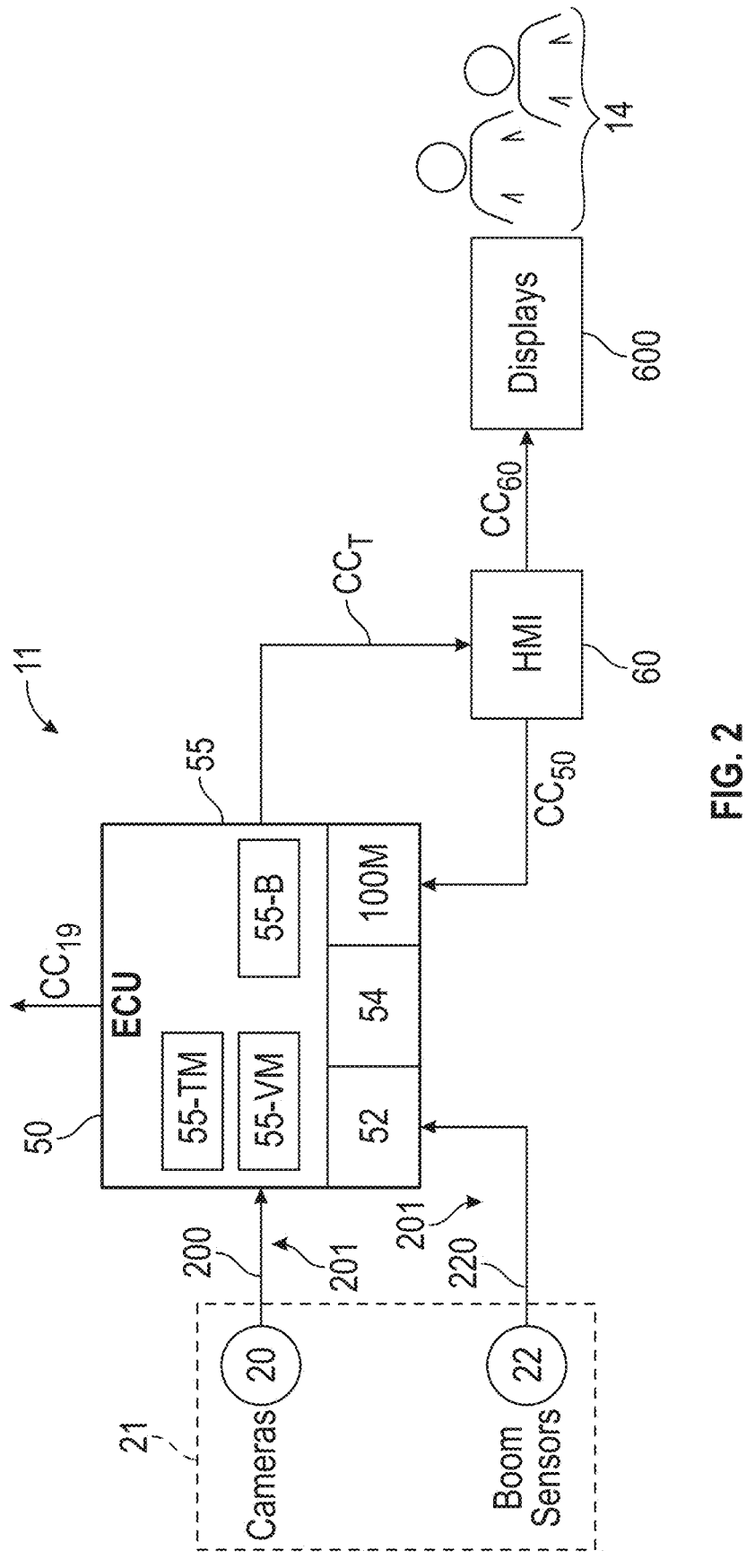
FIG. 2 is a schematic flow diagram of an exemplary boom guidance system operable for controlling the boom of FIG. 1 during the A3R mission in accordance with the present method.

Referring briefly to FIG. 2, the boom guidance system 11 in one or more implementations includes an electronic control unit (ECU) 50, which may be programmed for determining an identity of the receiver 12. The ECU 50 may identify the receiver 12 in flight, e.g., using machine learning or vision capabilities informed by real-time sensor data 201 from a plurality of sensors 21. For example, the sensor data 201 may include real-time image data 200 from one or more tanker-mounted cameras 20, with such cameras 20 being included in the above-noted sensors 21. The ECU 50 includes a tangible, non-transitory storage medium (memory) 52 on which is recorded a vision model, which is shown schematically as a vision model 55-VM. For instance, the ECU 50 may process the image data 200 to automatically identify a fuel-receiving receptacle 13 on the receiver 12. The tanker 10 may be used to refuel a number of suitably-equipped receivers 12, such as but not limited to cargo planes, other tankers, surveillance and/or reconnaissance aircraft, air traffic control aircraft, weather monitoring aircraft, etc. The depicted construction of the receiver 12 of FIG. 1 is therefore illustrative of just one possible embodiment thereof.

The boom 18, a proximal end (pivot) E2 of which is connected to the fuselage 24 of the tanker 10 as shown in FIG. 1, moves within the slipstream of the tanker 10 with a level of flight control afforded by boom flight control surfaces 19 as appreciated in the art. The boom 18 is a telescoping device, and thus has a variable length relative to the boom pivot E2. One or more of the cameras 20 are securely mounted to the tanker 10 on or near the boom pivot E2 to enable accurate visualization of the receiver 12 and the boom 18 during the A3R mission.

Flight control signals ($CC_{19}$) operate as actuator commands to the control surfaces 19 during flight control operations of the boom 18, and are typically transmitted by-wire from operator inputs from one or more boom operators 14, with the end result being the guidance of a distal end/boom tip E1 of the boom 18 into mating engagement with the receptacle 13 located on the receiver 12. In the non-limiting embodiment of FIG. 1, for instance, the receptacle 13 is located on a fuselage 124 of the receiver 12 just aft of and adjacent to a canopy 15, and well forward of a set of vertical stabilizers 17. However, the actual location of the receptacle 13 on a given receiver 12 will vary with the particular construction of the receiver 12, and therefore the embodiment of FIG. 1 illustrates just one possible location.

As set forth in detail below, the method 100M performed by the ECU 50 of FIG. 2 utilizes a boom model 55-B, the vision model 55-VM, such as a machine learning based vision model for identifying a location of the receptacle 13, and a transformation model 55-TM when determining if an automatic breakaway of the boom 18 from the receiver 12 should be initiated. In one example, the automatic breakaway is initiated when at least one operating parameter of the receiver 12, such as a receiver status, satisfies a corresponding breakaway parameter as discussed in greater detail below. When the automatic breakaway is initiated, the ECU 50 may selectively augment the flight control signals ($CC_{19}$) to the boom 18 to help avoid the receiver 12, such as by performing an evasive maneuver with the boom 18.

The boom operators 14 illustrated in FIG. 2, i.e., trained personnel/aircrew trained to supervise and possibly perform portions of the disclosed aerial refueling tasks as needed, may be situated aboard the tanker 10 of FIG. 1, typically in proximity to/aft of a cockpit 16 thereof. The boom operators 14 may closely supervise and possibly control motion of the boom 18 during the A3R mission depicted in FIG. 1. When performing this task, the boom operators 14 and the ECU 50 of FIG. 2 are assisted in visualizing the receiver 12 and the boom 18 by the cameras 20, with the collected image data 200 from the cameras 20 being communicated to the ECU 50. Each camera 20 may be optionally embodied as rearward-facing monocular, or stereo cameras of an application-specific spectral capability, configured to output real-time image data as part of the real-time sensor data 201. For example, the camera(s) 20 could be configured to collect the real-time image data 200 in a human-visible/red-green-blue (RGB) spectral range, or using near-infrared (near-IR), infrared (IR), or other portions of the electromagnetic spectrum.

The ECU 50 shown in FIG. 2 is also in communication with one or more boom sensors 22, e.g., rotary encoders and linear position sensors, to receive boom position data 220 descriptive of the current position, attitude, and telescope position/length of the boom 18 in free space as the boom 18 trails behind the tanker 10. As appreciated in the art, the boom 18 is pivotably mounted to the fuselage 24 of the tanker 10 at the location of the boom pivot E2 of FIG. 1, itself a motorized pivoting and rotating (revolute) joint allowing the boom 18 to be flown to a commanded position in free space. The boom 18 is also configured to extend toward the receiver 12 and retract toward the tanker 10, and thus is constructed as a telescoping device. Thus, the length or telescope position of the boom 18 is another positional value used herein by the ECU 50 in the overall control of the boom 18.

During the A3R mission illustrated in FIG. 1, the ECU 50 of FIG. 2 is used to help guide the boom tip E1 toward and into mating engagement with the receptacle 13 located on the receiver 12. As discussed in greater detail below, initiating the automatic breakaway can include at least directing the boom 18 to perform an independent disconnect (IDS) from the receiver 12, activating an alert, such as activating pilot director lights 27 on the tanker 10, and performing the evasive maneuver with the boom 18 to increase a separation distance between the boom 18 and the receiver 12.

Within the scope of the present disclosure, the image data 200 from the cameras 20 is used by the ECU 50 to determine a position of receptacle 13 on the receiver 12 when controlling motion of the boom 18. The boom operators 14 and the ECU 50, informed by the image data 200 and the boom position data 220, then impart or request that electronic control signals ($CC_{50}$) be communicated to the ECU 50, for instance autonomously or possibly using a human-machine interface (HMI) device 60 that is in wired or wireless communication with the ECU 50. The HMI device 60 of FIG. 2 in one or more embodiments could include, by way of example and not of limitation, one or more high-resolution display screens (Displays) 600 controllable via display input signals ($CC_{60}$), e.g., touch-sensitive screens, as well as keyboards, joysticks, dials, etc. In one or more embodiments, the ECU 50 may transmit a trajectory display signal (CCT) to the HMI 60 to cause the HMI 60 to present a 2D or 3D representation of trajectory lines (not shown) to the boom operators 14 via the displays 600.

Ultimately, the electronic control signals ($CC_{50}$) cause the ECU 50, using its memory 52 and one or more processors 54, to electronically control a corresponding attitude of the flight control surfaces 19 of the boom 18 by transmitting the flight control signals ($CC_{19}$). In other words, the boom 18 is controllable in a fly-by-wire manner in one or more implementations, such that there is no physical control link between the boom operators 14 and the boom 18. Other control implementations may be envisioned within the scope of the disclosure, including semi-autonomous or fully-autonomous control implementations, and therefore the present solutions are not limited to crewed aerial refueling operations as described herein.

Figure 3:
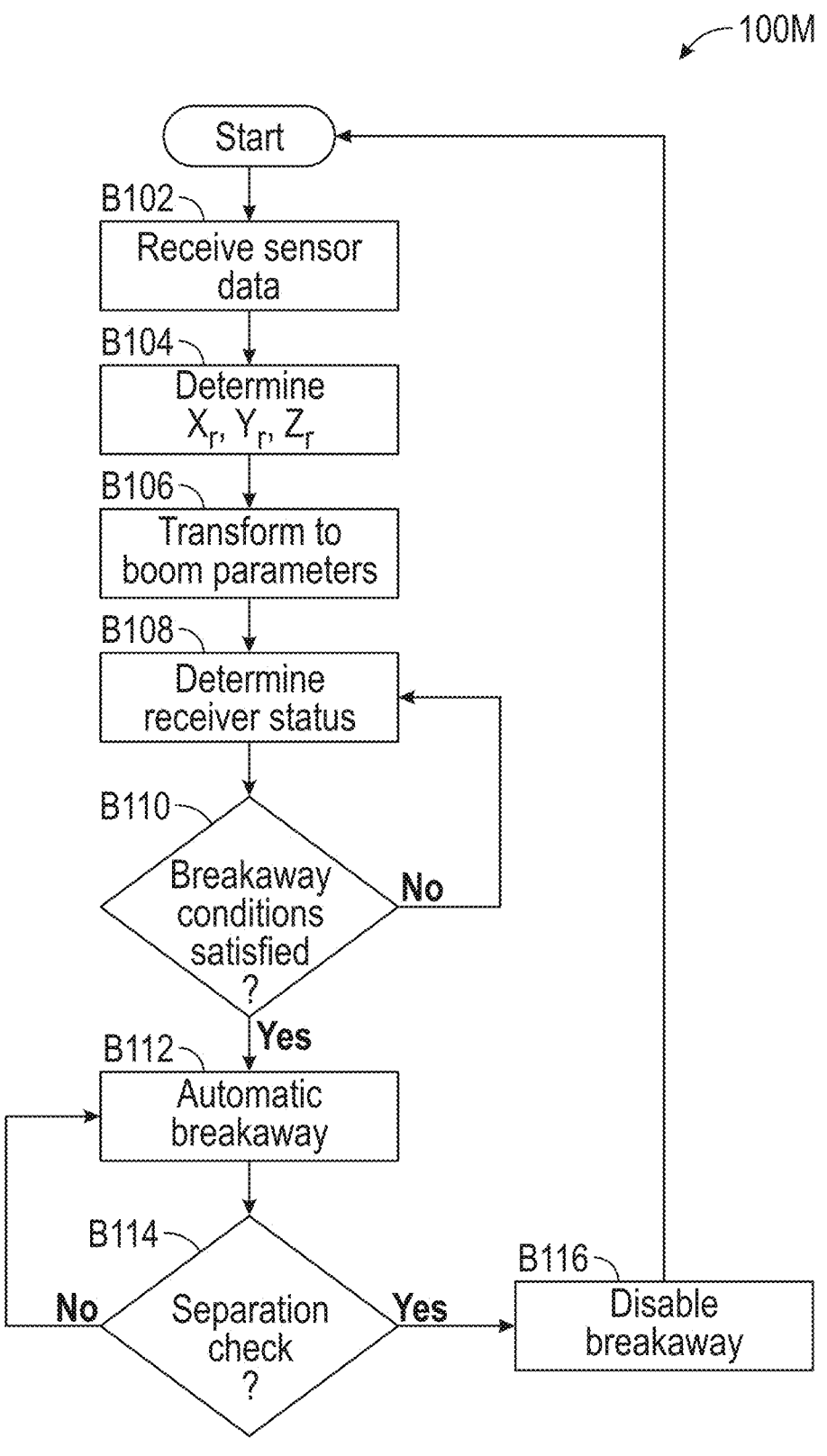
FIG. 3 is a flow chart describing an exemplary embodiment of the present method.

The ECU 50 of FIG. 2 may be embodied as one or more computer systems configured to execute computer-readable instructions embodying the method 100M of FIG. 3. As contemplated herein, the processor(s) 54 may be implemented as a microcontroller, one or more Application Specific Integrated Circuit(s) (ASICs), Field-Programmable Gate Array (FPGAs), electronic circuits, central processing units (CPUs), etc. The memory 52 in turn includes associated transitory and non-transitory memory/computer storage media, e.g., read only memory, programmable read only memory, solid-state memory, random access memory, optical and/or magnetic memory, etc. Computer-readable instructions embodying the method 100M may be recorded in memory 52 and executed by the processor(s) 54 as machine-readable code/instructions, software, and/or firmware programs. Other hardware components of the schematically-depicted ECU 50 are omitted for simplicity but are well understood in the art, such as combinational logic circuits, input/output (I/O) circuits, digital and analog signal conditioning/buffer circuitry, and other hardware components that may be accessed as needed by the processor(s) 54 to provide the control functionality described herein. Execution of the method 100M requires access to and use of the boom model 55-B, the vision model 55-VM and the transformation model 55-TM, which will now be described with continued reference to FIGS. 1 and 2.

The boom model 55-B as contemplated herein, may be implemented as a straight-line segment extending between two endpoints, i.e., the boom tip E1 and the boom pivot E2 of FIG. 1. The boom model 55-B includes every point on a line between the boom tip E1 and the boom pivot E2. The predetermined kinematics of the boom 18, which may also be considered as part of the boom model 55-B, are used by the ECU 50 to determine how the boom 18 is free to move in free space and describe where the boom tip E1 is with respect to the boom pivot E2. Such information also provides the ECU 50 with a way to convert points on the "E2-to-E1" line segment between two different coordinate systems, i.e., a coordinate system of the boom 18 aboard the tanker 10 and a coordinate system of the receiver 12 as initially represented in its own frame of reference.

As set forth below, a linear transformation is performed by the ECU 50 of FIG. 2 to convert points on the boom 18 based on the boom position data 220 (i.e., pitch, roll, and telescope position), to corresponding 3D positions taken with respect to nominal Cartesian axes (X, Y, Z) from the perspective of the boom pivot E2. Use of the boom model 55-B also enables the reverse conversion of points on the Cartesian axes from the boom pivot E2 to the pitch, roll, and telescope length information. Such position transformation enables two dissimilar sensor measurements for the boom 18 and the receiver 12 to have a common representation.

Referring now to FIG. 3, an exemplary embodiment of the method 100M is described as a series of process steps or blocks for illustrative clarity. Each block may be performed by the ECU 50 of FIG. 2 in the course of an A3R mission to determine if an automatic breakaway of the boom 18 depicted in FIG. 1 should be inititated. As part of the method 100M, the ECU 50 receives at block B102 sensor data 201, including the image data 200 and the boom position data 220 of FIG. 2, from the respective cameras and boom sensors 20 and 22, with the sensor data 201 being indicative of a 3D position of the receiver 12 and the boom 18 in a receiver reference frame and a boom reference frame, respectively. The method 100M thereafter proceeds to block B104.

Block B104 ("Determine $X_r$, $Y_r$, $Z_r$") entails determining Cartesian positions of the receptacle 13, i.e., [$X_r$, $Y_r$, $Z_r$] relative to a reference frame on the tanker 10, such as the boom pivot E2. In one example, this includes taking the origin at the receptacle 13 [0, 0, 0] in the reference frame of the receiver 12 and transforming it to [$X_r$, $Y_r$, $Z_r$] in the reference frame of the boom pivot E2. Determining the Cartesian positions of the receptacle 13 relative to the tanker 10 may be accomplished using the vision model 55-VM and the cameras 20 collecting real-time image data 200. In particular, the vision model 55-VM can apply a machine learning technique to track the receptacle 13 in real time in the reference frame of the boom pivot E2 on the tanker 10. The method 100M thereafter proceeds to block B106.

At block B106 ("Transform to Boom Parameters"), the ECU 50 performs a non-linear kinematic transformation of the Coordinates [$X_r$, $Y_r$, $Z_r$] to a set of boom parameters, i.e., pitch ($\theta$), roll ($\phi$), and telescope (l) along with their respective rate of change $\dot{\theta}$, $\dot{\phi}$, and $\dot{l}$. This may be achieved using the transformation model 55-TM as schematically illustrated in FIG. 2. The method 100M thereafter proceeds to block B108.

Still referring to FIG. 3, block B108 ("Receiver Status") entails utilizing the boom parameters describing the location and movement of the receptacle 13 to determine a "Receiver Status". In the illustrated example, the receiver status can include a closure rate of the receiver 12 relative to the boom 18 or tanker 10 for determining if the receiver 12 will overrun the boom 18 or tanker 10, a distance between the receptacle 13 and the boom 18 or tanker 10 for determining if the receptacle 13 is too close or out of range, or a stability of the receiver 12 as quantified by a magnitude of any one of the rates of change of the boom parameters. Additionally, the receiver status can include determining if the receiver 12 is within a disconnect envelope surrounding the receiver 12 or determining if the receiver 12 is within a contact envelope relative to the boom 18. With the receiver status determined from the boom parameters, the method 100M proceeds to block B110.

At block B110, the method 100M determines if the receiver status discussed above in block B108 satisfies a corresponding automatic breakaway condition. The automatic breakaway conditions are established by applying a machine learning technique or other traditional methods such as data mining and heuristics to a database including the receiver status described in block B108 for a similar or identical receiver 12 where the boom operator 14 initiated a breakaway of the boom 18 from the receiver 12. This allows the method 100M to determine the automatic breakaway conditions by being trained on a dataset that quantifies a decision making process of the boom operators 14 in terms of receiver status when the breakaway was initiated by the boom operator 14. If a predetermined number of the automatic breakaway conditions are not satisfied by the receiver status, the method 100M returns to block B108 to continue monitoring the receiver status. If the receiver status satisfies a predetermined number of the automatic breakaway conditions at block B110, the method 100M proceeds to block B112.

At block B112 the method 100M initiates an automatic breakaway of the boom 18. In one example, the automatic breakaway can include initiating an alert on the tanker 10, such as pilot director lights 27 on a belly of the tanker 10, and initiating an independent disconnect (IDS) if the boom 18 is in contact with the receptacle 13. Furthermore, the pilot director lights 27 on the tanker 10 signal to a pilot of the receiver 12 to move away from the tanker 10 and initiate another approach maneuver with the tanker 10.

The automatic breakaway can also include performing an evasive maneuver with the boom 18 to move the boom 18 away from the receiver 12 in a quick and efficient manner. For example, the evasive maneuver can include retracting the boom 18 and pivoting it away from the receiver 12, such as to a maximum pivot location, to provide the greatest amount of clearance between the boom 18 and the receiver 12. After the automatic breakaway at block B112 has been initiated, the method 100M proceeds to block B114.

At block B114, the method 100M determines if a separation of the boom 18 and the receiver has been completed such that the receiver status that led to the automatic breakaway is no longer present. If the receiver status that led to the automatic breakaway is still present, the method 100M returns to block B112 and maintains the boom 18 in the evasive maneuver position until the receiver status is no longer present. When the receiver status that satisfied the automatic breakaway conditions is no longer present, the method 100M proceeds to block B116.

At block B116, the automatic breakaway is disabled. In one example, when the automatic breakaway is disabled, the boom 18 returns to a home position and terminates the alert triggered by the automatic breakaway. At this point, the method 100M can return to the start and receiver 12 and tanker 10 can engage in another approach maneuver if desired.

The following Clauses provide example configurations of systems and methods for an example method 100M of performing an automatic breakaway of FIG. 3.

Clause 1: A boom guidance system for use during an automated air-to-air refueling (A3R) mission, the boom guidance system comprising: a plurality of sensors configured to output sensor data indicative of a three-dimensional (3D) position of a fuel-receiving aircraft (receiver) and a refueling boom of a fuel-supplying aircraft (tanker) in a tanker reference frame and a boom reference frame, respectively; and an electronic control unit ("ECU") in communication with the plurality of sensors, wherein the ECU is programmed to: receive the sensor data regarding a location of a receptacle on the receiver; determine coordinates for a receptacle on the receiver in a tanker reference frame; transform the coordinates for the receptacle in the tanker reference frame into boom parameters; determine a receiver status for the receiver based on the boom parameters; and initiate an automatic breakaway of the refueling boom from the receiver when the receiver status satisfies a corresponding automatic breakaway condition.

Clause 2: The boom guidance system of clause 1, wherein the sensors include a rearward-facing camera configured to output real-time image data as part of the sensor data, and wherein the ECU is configured to identify the receptacle on the receiver during the A3R mission.

Clause 3: The boom guidance system of clauses 1-2, wherein the boom parameters include a pitch, a roll, and a telescopic position of the receiver relative to a boom reference frame and corresponding rates of change for the pitch, the roll, and the telescopic position.

Clause 4: The boom guidance system of clauses 1-3, wherein the ECU is programmed to determine if a magnitude of at least one of the corresponding rates of change satisfies a corresponding automatic breakaway condition and initiate the automatic breakaway if satisfied.

Clause 5: The boom guidance system of clauses 1-4, wherein the receiver status includes a position of the receiver relative to a disconnect envelope surrounding the receiver or a contact envelope for the receptacle on the receiver.

Clause 6: The boom guidance system of clauses 1-5, wherein the ECU is programmed to determine if the position of the receiver relative to the disconnect envelope or the contact envelope satisfies a corresponding automatic breakaway condition and initiate the automatic breakaway if satisfied.

Clause 7: The boom guidance system of clauses 1-6, wherein the receiver status includes a distance between the refueling boom and the receiver.

Clause 8: The boom guidance system of clauses 1-7, wherein the ECU is programmed to determine if the receiver is out of range for engagement with the refueling boom or if the receiver is too close for engagement with the refueling boom.

Clause 9: The boom guidance system of clauses 1-8, wherein the ECU is programmed to determine a closure rate of the receiver based on the boom parameters and initiate the automatic breakaway if the closure rate satisfies a corresponding breakaway condition.

Clause 10: The boom guidance system of clauses 1-9, wherein the automatic breakaway of the refueling boom includes performing an evasive maneuver with the refueling boom.

Clause 11: The boom guidance system of clause 1-10, wherein the ECU is programmed to maintain the refueling boom in an automatic breakaway position until the receiver status that satisfied the corresponding automatic breakaway condition is no longer satisfied.

Clause 12: A method for controlling an automated air-to-air refueling (A3R) mission, the method comprising: receiving sensor data regarding a location of a receptacle on the receiver, wherein the sensor data is indicative of a three-dimensional (3D) position of a fuel-receiving aircraft (receiver) and a refueling boom of a fuel-supplying aircraft (tanker) in a tanker reference frame and a boom reference frame, respectively; determining coordinates for a receptacle on the receiver in a tanker reference frame; transforming the coordinates of the receptacle in the tanker reference frame into boom parameters; determining a receiver status for the receiver based on the boom parameters; and initiating an automatic breakaway of the refueling boom from the receiver when the receiver status satisfies a corresponding automatic breakaway condition.

Clause 13: The method of clause 12, wherein the sensor data includes real-time image data obtained from a rearward facing camera on the tanker, and wherein the ECU is configured to identify the receptacle on the receiver during the A3R mission.

Clause 14: The method of clauses 12-13, wherein the boom parameters include a pitch, a roll, and a telescopic position of the receiver relative to a boom reference frame and corresponding rates of change for the pitch, roll, and telescopic position.

Clause 15: The method of clauses 12-14, including determining if a magnitude of at least one of the corresponding rates of change satisfies a corresponding automatic breakaway condition and initiating the automatic breakaway if satisfied.

Clause 16: The method of clauses 12-15, including determining a closure rate of the receiver based on the boom parameters and initiating the automatic breakaway if the closure rate satisfies a corresponding breakaway condition.

Clause 17: The method of clauses 12-16, including maintaining the refueling boom in an automatic breakaway position until the receiver status that satisfied the corresponding automatic breakaway condition is no longer satisfied.

Clause 18: A tanker comprising: a fuselage configured to transport aviation fuel; a refueling boom connected to the fuselage; and a boom guidance system for use during an automated air-to-air refueling (A3R) mission, the boom guidance system comprising: a plurality of sensors configured to output sensor data indicative of a three-dimensional (3D) position of a fuel-receiving aircraft (receiver) and a refueling boom of a fuel-supplying aircraft (tanker) in a tanker reference frame and a boom reference frame, respectively; and an electronic control unit ("ECU") in communication with the plurality of sensors, wherein the ECU is programmed to: receive the sensor data regarding a location of a receptacle on the receiver; determine coordinates for a receptacle on the receiver in a tanker reference frame; transform the coordinates for the receptacle in the tanker reference frame into boom parameters; determine a receiver status for the receiver based on the boom parameters; and initiate an automatic breakaway of the refueling boom from the receiver when the receiver status satisfies a corresponding automatic breakaway condition.

Clause 19: The tanker of clause 18, wherein the sensors include a rearward-facing camera configured to output real-time image data as part of the sensor data, and wherein the ECU is configured to identify the receptacle on the receiver during the A3R mission.

Clause 20: The tanker of clauses 18-19, wherein the boom parameters include a pitch, a roll, and a telescopic position of the receiver relative to a boom reference frame and corresponding rates of change for the pitch, roll, and telescopic position.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

What is claimed is:

1. A boom guidance system for use during an automated air-to-air refueling (A3R) mission, the boom guidance system comprising:
   a plurality of sensors configured to output sensor data indicative of a three-dimensional (3D) position of a fuel-receiving aircraft (receiver) and a refueling boom of a fuel-supplying aircraft (tanker) in a tanker reference frame and a boom reference frame, respectively; and an electronic control unit ("ECU") in communication with the plurality of sensors, wherein the ECU is programmed to:
   receive the sensor data regarding a location of a receptacle on the receiver;
   determine coordinates for the receptacle on the receiver in the tanker reference frame;
   transform the coordinates for the receptacle in the tanker reference frame into boom parameters in the boom reference frame, the boom parameters including a pitch, a roll, and a telescopic position of the receiver relative to the boom reference frame;
   determine a receiver status for the receiver based on the boom parameters; and
   initiate an automatic breakaway of the refueling boom from the receiver when the receiver status satisfies a corresponding automatic breakaway condition.

2. The boom guidance system of claim 1, wherein the sensors include a rearward-facing camera configured to output real-time image data as part of the sensor data, and wherein the ECU is configured to identify the receptacle on the receiver during the A3R mission using the real-time image data.

3. The boom guidance system of claim 1, wherein the boom parameters include corresponding rates of change for the pitch, the roll, and the telescopic position.

4. The boom guidance system of claim 3, wherein the ECU is programmed to determine if a magnitude of at least one of the corresponding rates of change satisfies the corresponding automatic breakaway condition and initiate the automatic breakaway if the automatic breakaway condition is satisfied.

5. The boom guidance system of claim 1, wherein the receiver status includes a position of the receiver relative to a disconnect envelope surrounding the receiver or a contact envelope for the receptacle on the receiver.

6. The boom guidance system of claim 5, wherein the ECU is programmed to determine if the position of the receiver relative to the disconnect envelope or the contact envelope satisfies the corresponding automatic breakaway condition and initiate the automatic breakaway if automatic breakaway condition is satisfied.

7. The boom guidance system of claim 1, wherein the receiver status includes a distance between the refueling boom and the receiver.

8. The boom guidance system of claim 7, wherein the ECU is programmed to determine if the receiver is out of range for engagement with the refueling boom or if the receiver is too close for engagement with the refueling boom.

9. The boom guidance system of claim 1, wherein the ECU is programmed to determine a closure rate of the receiver based on the boom parameters and initiate the automatic breakaway if the closure rate satisfies a corresponding breakaway condition.

10. The boom guidance system of claim 1, wherein the automatic breakaway of the refueling boom includes performing an evasive maneuver with the refueling boom.

11. The boom guidance system of claim 1, wherein the ECU is programmed to maintain the refueling boom in an automatic breakaway position until the receiver status that satisfied the corresponding automatic breakaway condition is no longer satisfied.

12. A method for controlling an automated air-to-air refueling (A3R) mission, the method comprising:
   receiving sensor data regarding a location of a receptacle on a fuel-receiving aircraft (receiver), wherein the sensor data is indicative of a three-dimensional (3D) position of the receiver and a refueling boom of a fuel-supplying aircraft (tanker) in a tanker reference frame and a boom reference frame, respectively;

determining coordinates for the receptacle on the receiver in the tanker reference frame;

transforming the coordinates of the receptacle in the tanker reference frame into boom parameters in the boom reference frame, the boom parameters including a pitch, a roll, and a telescopic position of the receiver relative to the boom reference frame;

determining a receiver status for the receiver based on the boom parameters; and initiating an automatic breakaway of the refueling boom from the receiver when the receiver status satisfies a corresponding automatic breakaway condition.

13. The method of claim 12, wherein the sensor data includes real-time image data obtained from a rearward facing camera on the tanker, and wherein the method further comprises identifying the receptacle on the receiver during the A3R mission using the real-time image data.

14. The method of claim 12, wherein the boom parameters include corresponding rates of change for the pitch, the roll, and the telescopic position.

15. The method of claim 14, including determining if a magnitude of at least one of the corresponding rates of change satisfies the corresponding automatic breakaway condition and initiating the automatic breakaway if satisfied.

16. The method of claim 12, including determining a closure rate of the receiver based on the boom parameters and initiating the automatic breakaway if the closure rate satisfies a corresponding breakaway condition.

17. The method of claim 12, including maintaining the refueling boom in an automatic breakaway position until the receiver status that satisfied the corresponding automatic breakaway condition is no longer satisfied.

18. A tanker comprising:

a fuselage configured to transport aviation fuel;

a refueling boom connected to the fuselage; and a boom guidance system for use during an automated air-to-air refueling (A3R) mission, the boom guidance system comprising:

a plurality of sensors configured to output sensor data indicative of a three-dimensional (3D) position of a fuel-receiving aircraft (receiver) and a refueling boom of a fuel-supplying aircraft (tanker) in a tanker reference frame and a boom reference frame, respectively; and an electronic control unit ("ECU") in communication with the plurality of sensors, wherein the ECU is programmed to:

receive the sensor data regarding a location of a receptacle on the receiver;

determine coordinates for the receptacle on the receiver in the tanker reference frame;

transform the coordinates for the receptacle in the tanker reference frame into boom parameters in the boom reference frame, the boom parameters including a pitch, a roll, and a telescopic position of the receiver relative to the boom reference frame;

determine a receiver status for the receiver based on the boom parameters; and initiate an automatic breakaway of the refueling boom from the receiver when the receiver status satisfies a corresponding automatic breakaway condition.

19. The tanker of claim 18, wherein the sensors include a rearward-facing camera configured to output real-time image data as part of the sensor data, and wherein the ECU is configured to identify the receptacle on the receiver during the A3R mission based on the real-time image data.

20. The tanker of claim 18, wherein the boom parameters include corresponding rates of change for the pitch, roll, and telescopic position.

* * * * *